March 15, 1949.  L. J. ERTL  2,464,297
PORTABLE KEY SEAT MILLING MACHINE
Filed April 1, 1947
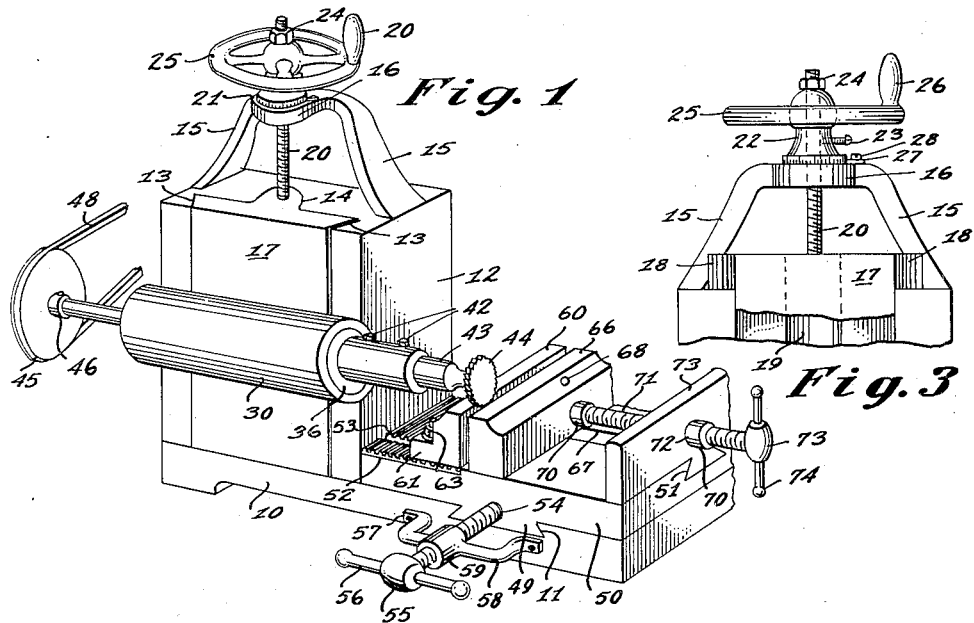
Fig. 1
Fig. 3
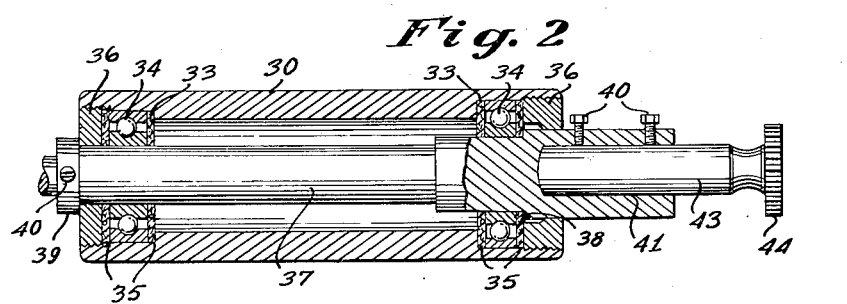
Fig. 2
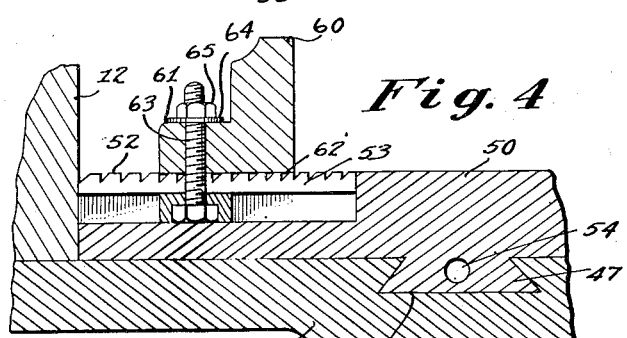
Fig. 4
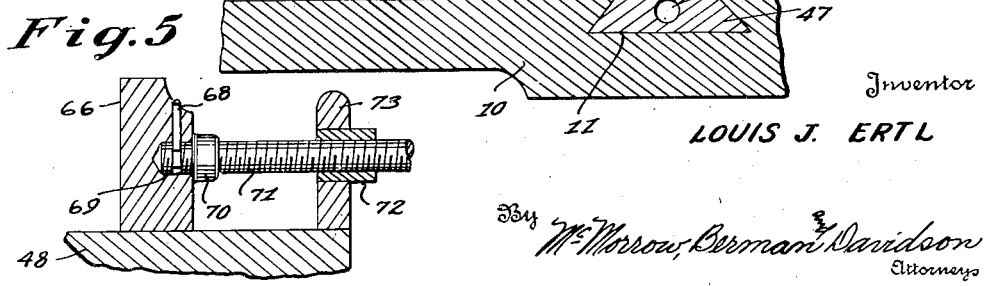
Fig. 5
Inventor
LOUIS J. ERTL
By McMorrow, Berman & Davidson
Attorneys Patented Mar. 15, 1949

2,464,297

UNITED STATES PATENT OFFICE 2,464,297

PORTABLE KEY SEAT MILLING MACHINE

Louis J. Ertl, Nebraska City, Nebr.

Application April 1, 1947, Serial No. 738,609

1 Claim. (Cl. 90—12)

This invention relates to a portable milling machine for milling key slots in shafts.

Key slots can be milled in shafts by the ordinary commercial milling machine. These machines are usually made only in very large sizes. The setting up of these machines is a long, involved procedure, and the adjustments to insert and remove the work are awkward to make.

The object of the present invention is to provide a light weight portable milling machine.

Another object of the present invention is to provide a light weight milling machine which is adapted to mill keyways in shafts on a mass production basis.

An additional object of the present invention is to provide a milling machine for milling keyways in shafts having a multiplicity of adjustments whereby the length, depth and width of the keyway, or the position of same with respect to the center line of the shaft, may be varied.

Still other objects, advantages and improvements will become apparent from the following specification, taken in connection with the accompanying drawings, in which:

Figure 1 is an isometric view of the milling machine of the present invention;

Figure 2 is a sectional view of the arbor and bearings therefor;

Figure 3 is a detail side elevational view showing in particular the slidable head and the means for adjusting same;

Figure 4 is a detail sectional view showing the adjustment means for mounting the fixed vise jaw; and Figure 5 is a detail sectional view showing the adjustment means for the movable vise jaw.

Referring now to the drawings in detail, and to Figure 1 in particular, the milling machine is here shown as mounted on a base plate 10. At one end of the base plate a block 12 is mounted in any suitable manner, as by stud bolts (not shown) extending from the under side of the base plate and into the block. At the top of the block 12 arms 15—15 are secured thereto in any suitable manner, as by welding (not shown). The arms 15—15 merge at their tops into an integral boss 16. A slidable plate 17 is mounted in a wide groove in one face of the block 12, this groove having dovetailed sides 13—13, and the plate having complementary beveled sides 18—18. Formed in the block 12 and centrally of the wide groove 13—13 there is a semi-cylindrical groove 14 in which a complementary semi-cylindrical rib 19 on the slidable block 17 is received. A threaded shaft 20 passes freely through the boss 16 between the arms 15—15 and is received in a suitably threaded axial hole in the semi-cylindrical rib 19.

A hand wheel 25 is mounted on the upper end of the threaded shaft 20, this hand wheel having a hub 22 which at its bottom is formed as a cylinder 21 with graduations thereon. The hand wheel 25 is secured to the shaft 20 by a top nut 24 and a set screw 23, the latter extending radially through the hub 22. On the circumference of the hand wheel 25 there is mounted a suitable handle 26. A pointer 27, which is secured to the boss 16 by screws 28, cooperates with the graduated cylinder 21 on the hub 22 to indicate the extent to which the slidable plate 17 has been raised or lowered, as the case may be.

A sleeve or hollow cylinder 30 is integrally formed with the slidable plate 17 and positioned transversely thereof. An arbor 35 is rotatably mounted within the sleeve 30. The interior of the sleeve 30 is counterbored from each end to form shoulders 33—33. Ball bearings 34—34 are mounted within the counterbores, apertured packing discs 35—35 being interposed between the ball bearings 34—34 and the shoulders 33—33, respectively. Duplicate apertured packing discs 35—35 are placed over the outer faces of the ball bearings 34—34 and the ball bearings 34—34 and packing discs are held in place by screw-threaded retaining rings 36 fitted in the counterbores. The arbor 37 is formed with a shoulder 38 which abuts the right packing disc 35 and ball bearing 34 (Figure 2) to prevent longitudinal movement of the arbor in one direction; longitudinal movement of the arbor in the opposite direction is prevented by collar 39 held on the arbor by a radially positioned set screw 40, which collar abuts the left retaining ring 36. The right end of the arbor 37 is formed with a bore 41 which receives a shank 43 of a milling cutter 44. This shank is held in position by a pair of radially extending set screws 42 extending through the arbor. At the left end the arbor 37 mounts a V pulley 45 which is secured thereon by a set screw 47 extending radially through a hub 46. A belt 48 runs over the pulley 45 and extends to a pulley (not shown) on either the shaft of an electric motor or a line shaft. When an electric motor is used, a one-quarter horse power motor has been found sufficient.

It will be apparent that the slidable plate 17 may be raised or lowered by manipulating the hand wheel 25 to vary the depth of the cut made by the milling cutter 44.

A work plate 50 is mounted on top of the base plate 10 at the right end (Figure 1) thereof. The base plate is formed with a dovetailed, transversely positioned groove 11 which receives a complementary tongue 49 on the work plate. A screw 54 is mounted in the tongue 49, centrally of the latter, for free rotation therein by means to be later described. The screw 54 has an integral boss 55 at its outer end through which a transversely positioned operating handle 56 extends. A U-shaped bearing bracket 58 is secured to the base plate 10 by stud bolts 57, and this bracket mounts a bushing 59 through which the screw 54 extends. It will be apparent that the work plate 50 may be shifted transversely of the base plate 10 by manipulation of the operating handle 56 to vary the length of the cut made by the milling cutter 44 in any piece of stock mounted on the work plate.

The left portion (Figure 1) of the work plate 50 is formed of serrated or saw-tooth construction at 52, and with a pair of transverse slots 53 (only one of these being shown), these slots being of inverted T shape in cross-section. A fixed vise jaw 60 has an outwardly extending bottom flange 61, and on its bottom is formed with a complementary serrated or saw-tooth construction 62. Bolts 63 have their heads mounted in the bottoms of the slots 53 and their shanks extending upwardly through same, these slots being only slightly wider at their tops than the diameters of the bolts, in a well known manner. The bolts 63 extend through suitable holes in the bottom flange 61 on the fixed vise jaw 60 and have nuts 65 on their tops with washers 64 thereunder.

A complementary vise jaw 66 is adjustable over the work plate 50. This vise jaw has an outwardly extending dovetailed tongue 67 secured thereto in any suitable manner, as by countersunk screws (not shown) extending upwardly through the tongue and into the vise jaw. The dovetailed tongue 65 is received in a longitudinally positioned dovetailed groove 69 in the work plate 50.

At the right end of the work plate 50 (Figures 1 and 5) an upwardly extending plate 73 is fixed in any suitable manner, as by countersunk screws (not shown) extending upwardly from the work plate and into the plate 73. A threaded bushing 72 is mounted through the plate 73 in any suitable manner, as by a force fit, and a screw 71 extends through this bushing. As shown in Figure 5, the inner end of the screw 71 is freely received in a suitable hole in the movable vise jaw 66, this end having a circumferential groove 69 therearound, and pin 68 extends downwardly from the top of the movable vise jaw 66 and is received in the groove 69 in this screw. On the outer face of the vise jaw 66 a collar 70 is mounted in any suitable manner, as by welding, this collar surrounding the screw 71 and providing additional bearing surface therefor. At the outer end of the screw 71 there is formed an integral boss 73 through which extends a transversely positioned operating handle 74. It will be apparent that the position of the cut formed by the milling cutter 44 with respect to the center line of the stock mounted between the vise jaws 60—66 may be varied by shifting the fixed vise jaw 60 along the serrated surface 62 on the work table 50. Also, after a first keyway has been cut, the fixed and adjustable jaws 60—66 may be shifted, with the stop gripped between them, over one or more of the serrations 52 in the work plate 50 in either direction to make a wider keyway, if desired.

The connection between the screw 54 and the tongue 49 on the work plate 50 is made by an identical construction to the groove and pin connection 68—69 between the screw 71 and the adjustable vise jaw 66.

It will be understood that the above description and illustration present the preferred embodiment of my invention, and that various changes may be made in the details of construction, arrangement and design of the various parts without departing from the spirit of the invention as defined in the appended claim.

Having thus described my invention, what I claim as new and useful and desire to secure by Letters Patent of the United States is:

In a milling machine comprising a driven arbor for carrying a milling cutter and a vise for holding a work piece, the features which include a base plate, slide guide means upon the latter plate for slidably restricting the vise to a path of movement transverse of the axis of the mandrel, a bracket on said base plate having a threaded hole therethrough, a manually adjustable threaded shaft extending through the threaded hole in the bracket in engagement with the thread therein and connected to said vise for shifting the latter with respect to the base plate, an upright block fixed on said base plate, a slidable plate having a horizontal sleeve fixed thereon for rotatably supporting said arbor upon one side of the upright block, guide means upon the latter slidably guiding and retaining the slidable plate in a vertical path of adjustment upwardly from and down to said base plate with the latter forming a stop limiting downward movement of said slidable plate and the sleeve thereon, an internally threaded boss on the upper portion of said upright block, and a second manually adjustable threaded shaft extending through said boss in engagement with the thread therein and connected to said slidable block for slidably adjusting the latter block vertically upon the side of said upright block at will.

LOUIS J. ERTL.

REFERENCES CITED

The following references are of record in the file of this patent:

UNITED STATES PATENTS

| Number | Name | Date |
| --- | --- | --- |
| 678,602 | Watson et al. | July 16, 1901 |
| 1,045,501 | Berghausen | Nov. 26, 1912 |
| 1,485,276 | Kuebler | Feb. 26, 1924 |